United States Patent [19]

Engle

[11] Patent Number: 4,978,178

[45] Date of Patent: Dec. 18, 1990

[54] AUTOMATIC SELF-RESETTING PARKING BRAKE

[75] Inventor: Thomas H. Engle, Stamford, Conn.

[73] Assignee: General Signal Corporation, Stamford, Conn.

[21] Appl. No.: 363,918

[22] Filed: Jun. 9, 1989

[51] Int. Cl.⁵ .............................................. F16D 65/14
[52] U.S. Cl. ...................................... 303/13; 188/107; 188/216; 303/89; 74/506
[58] Field of Search ...................... 303/13, 89, 71, 9.76, 303/2, 14, 57, 66, 81, 86; 188/170, 107, 216; 74/89.22, 89.21, 505, 506

[56] References Cited

U.S. PATENT DOCUMENTS

| 2,686,575 | 8/1954 | Bunker | 188/107 |
| 3,344,895 | 10/1967 | Holden et al. | 188/107 |
| 3,402,678 | 9/1968 | Miller | 188/107 X |
| 4,033,629 | 7/1977 | Spalding | |
| 4,236,424 | 12/1980 | Kanjo et al. | 74/505 |
| 4,346,790 | 8/1982 | Morrison et al. | 74/505 X |
| 4,746,171 | 5/1988 | Engle | 303/13 |

FOREIGN PATENT DOCUMENTS

| 1506522 | 12/1967 | France . |
| 2366967 | 5/1978 | France . |
| 2381646 | 9/1978 | France . |

Primary Examiner—Douglas C. Butler
Attorney, Agent, or Firm—Barnes & Thornburg

[57] ABSTRACT

A parking brake having an output lever connected at a first pivot point to a brake rod, at a second pivot point to a automatic fluid responsive actuator and at a third point to one end of a chain of a standard manual releaseable parking brake unit. The other end of the chain is connected to a reset lever which is activated by the automatic actuator to reset the manual parking brake unit after manual release and during automatic release. The automatic actuator includes an air bellows to drive a piston, and a simple interlock valve connecting the air spring to a brake line.

14 Claims, 5 Drawing Sheets 4,978,178

AUTOMATIC SELF-RESETTING PARKING BRAKE

BACKGROUND AND SUMMARY OF THE INVENTION

The present invention relates generally to spring-applied, air-pressure-released parking brakes for railroad vehicle and more particularly to such parking brakes in combination with manual handbrake control devices.

In my prior U.S. Pat. 4,746,171, I described such a system including a manually operable handbrake device for selectively governing operation brakes of the brake rigging under varying conditions, for example when the air supply is disconnected from the train. This system is illustrated in FIG. 1. Although this system has been found to be valuable in certain applications, there are other applications where an inexpensive, parking brake system is needed.

Thus it is an object of the present invention to provide a parking brake system with fewer parts.

Another object is to provide a parking brake system which may be used with pre-existing equipment such as a standard freight car handbrake unit.

These and other objects of the invention are obtained by a system wherein the pivotal connection of the manual actuator or handbrake unit to the output brake lever acts as a nonfixed fulcrum of the lever which rotates in response to a given force from the brake system. When the automatically applied parking brake is manually released, it may be manually reapplied at any time. If it is simply left released; however, the automatic actuator for the parking brakes will reset the manual actuator to its reset condition and position simultaneous with release of the brakes in response to release fluid pipe pressure The parking brake system includes an output lever having first, second and third pivot points. The output lever is pivotally connected to a brake actuating rod at the first pivot point, pivotally ConneCted to the automatic actuator at the second pivot point and pivotally connected to the manual actuator at the third pivot point. The automatic actuator pivots the output lever about the third pivot point as a fulcrum to move the first pivot point to a brake release or a brake application position in response to a release or application level of fluid pipe pressure respectively. The manual actuator pivots the output lever about the second pivot as a fulcrum to move the first pivot point to a brake release position in response to a manual activation of, for example, manual release control handles on a standard handbrake unit. The automatic actuator also moves the third pivot point from the normal release position to a manual reset position in response to the release fluid pipe pressure after manual release.

The first pivot point for the brake connection is between the second and the third pivot points for the automatic and manual actuators and equally distant therebetween. The automatic actuator includes a reset lever connected to the manual actuator for resetting the manual actuator after a manual release. The manual actuator includes a manually releaseable ratchet mechanism and a chain wound over a sheave and connected at one end to the third pivot point and at the other end to the reset lever. The automatic actuator includes a piston which is spring biased to move the first pivot point to a brake application position and is responsive to the release and application fluid pipe pressures in an air bellows acting on the piston. The air bellows may be a commercially available air spring. The manual actuator maintains the third pivot point fixed with respect to forces at the third pivot point in first direction and moveable with respect to forces at the third pivot point on second direction.

If the release pipe is the brake pipe of a standard automatic air brake system, an interlocking valve connects the automatic actuator to the brake pipe for preventing fluid flow from the automatic actuator to the brake pipe for brake pipe pressure above approximately 20 psi. A charging orifice or restriction delays or slows the fluid flow between the automatic actuator and the brake pipe.

Other objects, advantages and novel features of the present invention will become apparent from the following detailed description of the invention when considered in conjunction with the accompanying drawings.

DETAILED DESCRIPTION OF THE INVENTION

Figure 1:
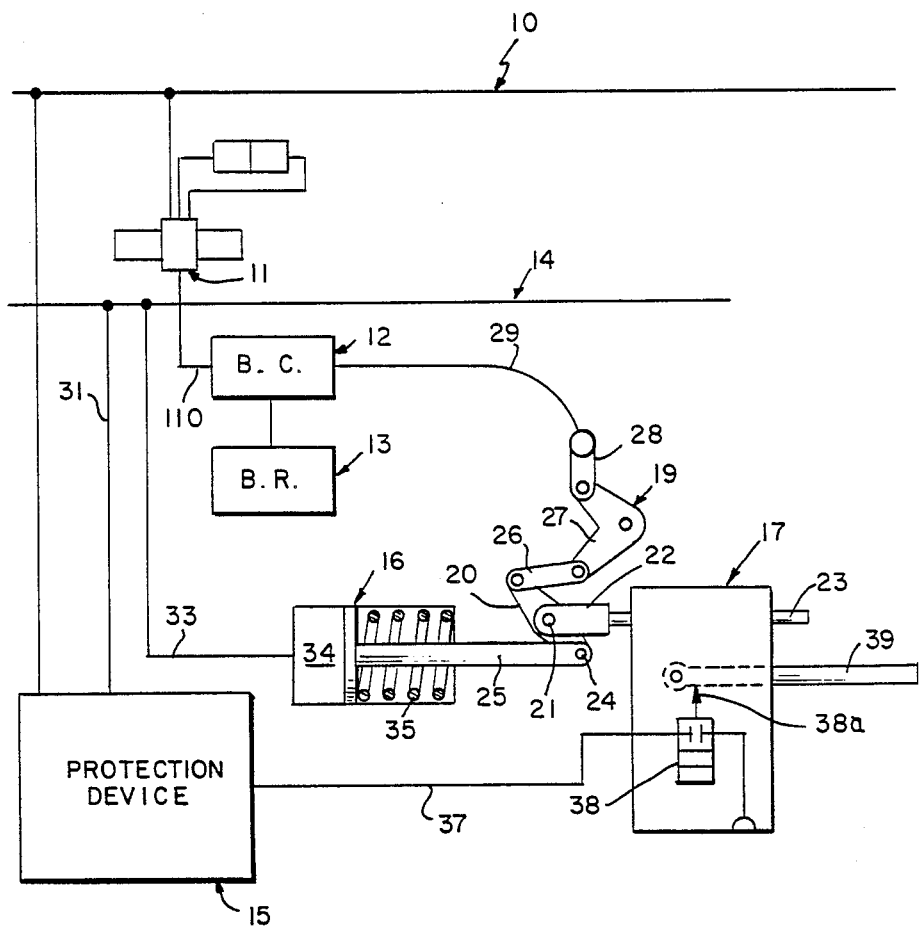
FIG. 1 is a schematic view of a prior art parking brake system of the U.S. Pat. No. 4,746,171.

With reference to FIG. 1, a fluid brake control system is illustrated as having a conventional brake pipe 10, a control valve device 11, a brake cylinder 12 and a brake rigging 13, all of which are operable in response to changes in fluid pressure in the brake pipe 10 according to usual practice that are hereby incorporated by references.

A handbrake control system, my U.S. Pat. No. 4,746,171 includes train, or handbrake pipe 14, a protective device 15, a fluid pressure releaseable spring handbrake cylinder 16 and a manually operable handbrake mechanism 17 having toggle type locking apparatus, all of which is operable through linkage 19 to selectively operate the brake cylinder 12 for applying brakes to the vehicle through operation of the brake rigging 13.

The linkage 19 comprises a brake link 20 that is connected at its mid-point by a clevis pin 21 fastening a clevis 22 on a manual handbrake rod 23. The lower end of the brake link 20 is connected by a pin 24 to a spring handbrake rod 25, and the upper end of the brake link 20 is connected by a link 26 to a lower arm of a bellcrank 27, the upper arm of which being connected through a link 28 to cables 29, which are connected to the piston (not shown) of brake cylinder 12 to actuate the brake rigging 13 to a brake application position by the rotation of the bell crank 27 in a clockwise direction for pulling on the cables 29.

Actuation of handle 39 through valve 38, line 37 to the protective device 15, lines 31 and 33 vent chamber 34 allowing spring 35 to move handbrake rod 25 to a brake application position and rotating linkage 19 in a counter clockwise direction. A brake application signal from the train pipe or train handbrake 14 will also cause rod 25 to move to a brake application position.

The specially designed manually operable handbrake mechanism 17 interacts with the system through the rod 23. Upon manual release, the rod 23 moves to the left moving the fulcrum 21 to operate linkage 19 to a released position. Reactivation of cylinder 16, by air pressure from pipe 14, moves the rod 23 back into a reset position by compression. This compression force reset required the design of a special handbrake mechanism 17, since none was commercially available. This required an expensive mechanism 17 and special mounting to the cars. Also interlocking valving is required to provide the pressure needed to operate the large piston 16 needed to reset the handbrake mechanism 17 and release the parking brake at brake pipe pressures lower than full service brake pipe pressures.

Figure 2:
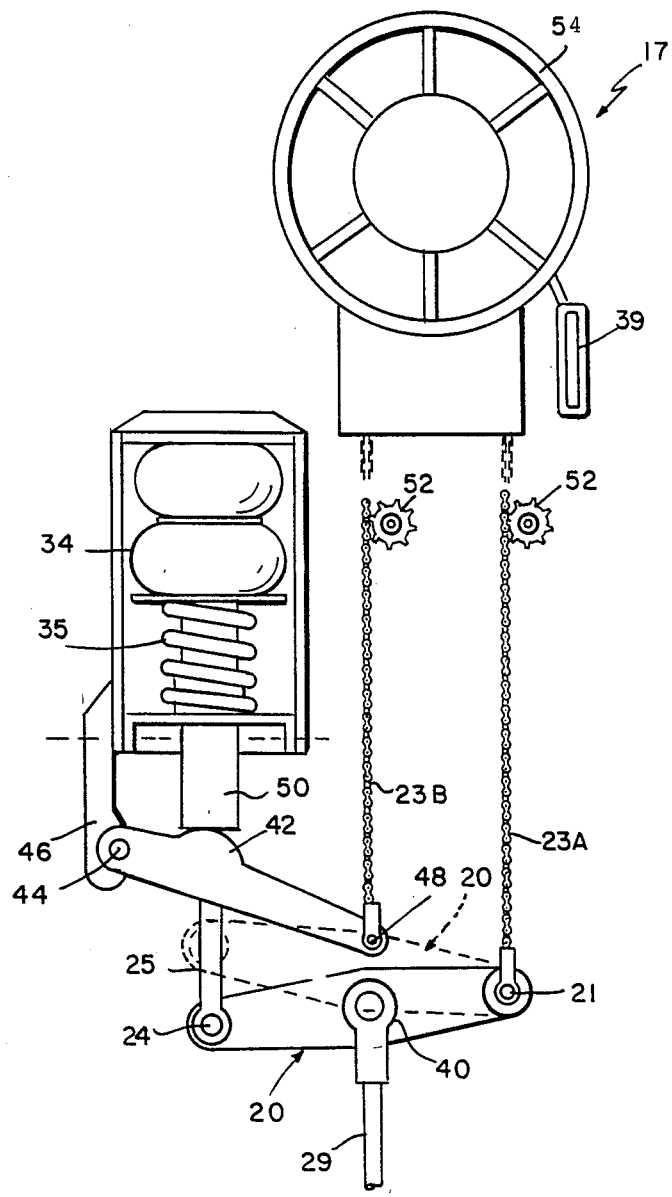
FIG. 2 is modified plan view of a parking brake release system according to the present invention in the automatic reset and released position.
Figure 3:
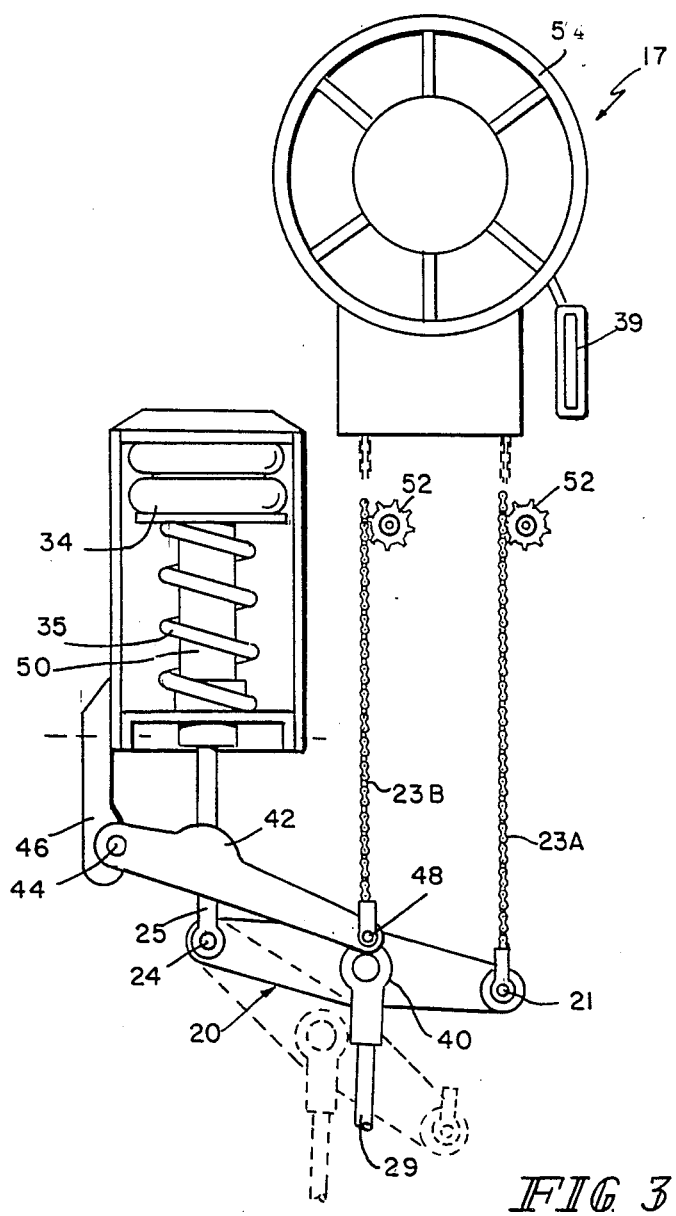
FIG. 3 is a modified plan view of a parking brake system according to the present invention in the automatic applied position.
Figure 4:
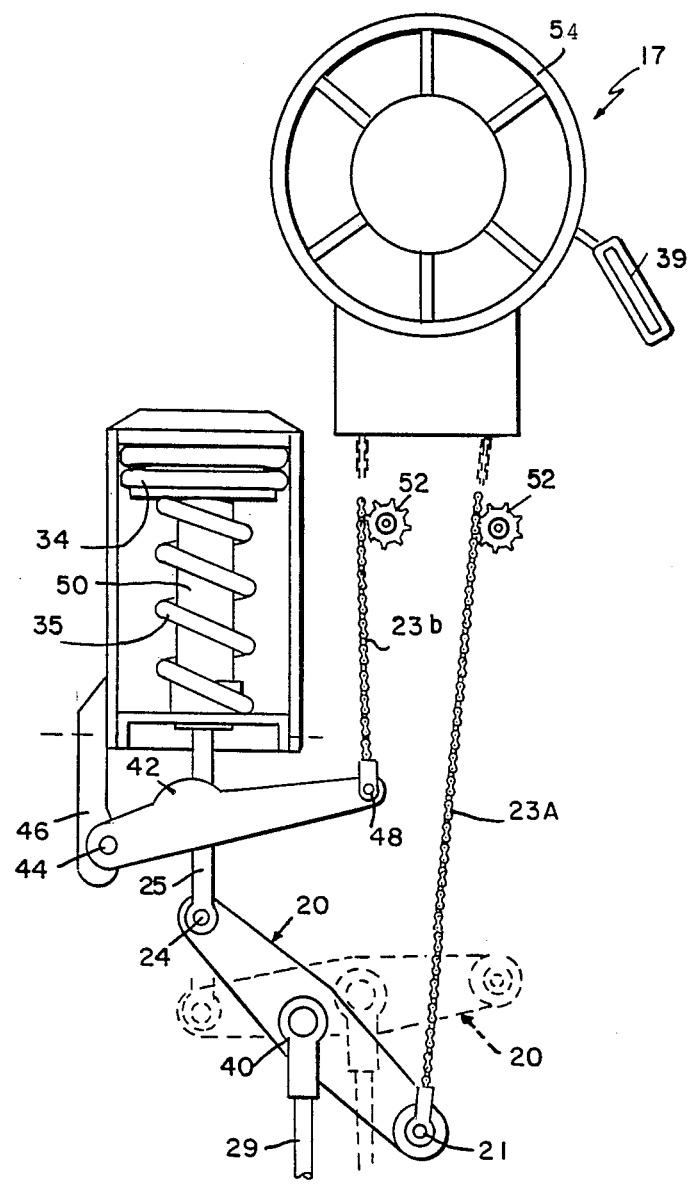
FIG. 4 is a modified plan view of a parking brake system according to the present invention in the manually released position.

The handbrake control system according to the present invention as illustrated in FIGS. 2 through 4 is a modification of the manually operable handbrake mechanism 17 and its inter-relationship to the remainder of the system. Elements having common function that of FIG. 1 to have the same reference number in FIGS. 2 through 4.

The fluid-pressure-releaseable, spring-application handbrake cylinder or automatic actuator 16 is shown as including a spring 35 opposing air bellow 34 to control the position of spring handbrake rod 25 which is pivotally connected at pivot point 24 to the brake link or output lever 20. A brake actuating rod or cable 29 is connect to the output lever 20 at pivot point 40. A manually operable handbrake mechanism 17 is shown as including a release mechanism 39, a brake chain 23A connected pivotally at pivot point 21 of the output lever 20 and a reset chain 23B. A reset lever 42 is pivotally connected at 44 to a bracket 46 which is connected the housing of the automatic actuator 16. The reset chain 23B is connected at 48 to the other end of the reset lever 42. A collar 54 on the spring handbrake rod 25 engages and interacts with the reset lever 42. The brake chain 23A and the reset chain 23B ride over pulleys 52. It should be noted that in FIGS. 2 through 4 the manually operated handbrake mechanism 17 has been rotated down into the plane of the remainder of the mechanism. Normally, it would be 90° thereto and lie in a vertical plane. The manually handbrake mechanism 17 is a commercially available ratchet mechanism such as the AJAX No. 7 which includes the brake chain 23A and has been modified to provide it with the reset chain 23B so as to be automatically resettable as will be explained in the operation with respect to FIGS. 2 through 4.

The brake rod 29 may be connected to the handbrake chain or cable which is part of a normal brake rigging, or to the brake cylinder or to any part of the brake rigging which will accomplish actuation and release.

The operation of the parking brake system will be described with respect to FIGS. 2 through 4. As illustrated in FIG. 2, the equipment is in the release and reset condition. Fluid pressure from the train or handbrake pipe 14 inflates the air bellow 34 to move the spring handbrake rod 25 down pivoting the output lever 20 about the pivot point 21 connected to the brake chain 23A. If the brake chain 23A was not initially in the normal or reset position, the downward motion of rod 25 causes collar 50 to engage the reset lever 42 pulling on the reset chain 23B. This motion of the reset chain 23B through the ratchet mechanism of 17 pulls the brake chain 23A up, bringing the pivot point 21 to its reset position and allowing it to function as a fulcrum against the counterclockwise motion of the output lever 20 being forced by the movement of rod 25.

For automatic parking brake application, the fluid pressure in train or handbrake pipe 14 decreases thereby collapsing the air bellows 34. Spring 35 pushes the piston upward retracting rod 25 causing the output lever 20 to pivot about pivot point 21 as a fulcrum up to the phantom position shown in FIG. 2 and the solid position shown in FIG. 3. This clockwise motion places the pivot point 40 and rod 25 in its automatic brake application position. It should be noted that since the brake rod pivot point 40 is between the pivot points 21 and 24 connected to the manual and automatic brake actuators, the output lever provides a 2 to 1 force multiplication on the brake rod 29 under these conditions.

Since the brake chain 23A and the reset chain 23B do not move between the automatic release position and the automatic application position of FIGS. 2 and 3 respectively, the reset lever 42 does not move. Thus the motion of the rod 25 and collar 50 upward upon deflation of air bellows 34 develops a gap D1 between the reset lever 42 and the collar 50. This frees the reset lever from the force of the collar 50 and removes all forces from the reset chain 23A. The heavy force produced by spring 35 on the pivot point 21 and brake chain 23A places the brake chain 23A under a greater tension. The ratchet lock of the manual actuator 17 prevents movement of the brake chain 23A.

The mechanisms will move between the solid and phantom position of the output lever 20 of FIG. 2 with changes of the pressure in the train or handbrake pipe 14.

To manually release the parking brake when the bellows 34 is not charged, release lever 39 is manually actuated causing the brake chain 23A to become slack. This causes the output lever 20 to pivot about pivot point 40 of the brake rod 29 producing further travel of the bellows 32 to further depress the air spring 34 until it reaches a stop. When this occurs, further downward movement of the brake chain 23A continues along with the downward movement of the pivot point 40 and the brake rod 29 until all force is lost from the brake rod 29 then thereby moving the pivot point 40 to its released position illustrated in phantom in FIG. 3 and in solid line in FIG. 4. Since the ratchet mechanism of the manual actuator 17 has been released, the downward movement or payout of the brake chain 23 draws-in the reset chain 23A moving the reset lever 42 upward in FIG. 4. Because of the further movement of the rod 25 and the reset lever 42, the distance of separation between the collar 50 and the reset rod 42 is diminished to a distance D2 FIG. 4.

Since the reset lever ratio is 2 to 1, the payout of the brake chain 23A through its full travel only pulls up the reset chain 23B and the reset lever 42 about half of the travel distance. From this manually released position, the parking brake can be easily re-applied by an operator who simply winds up the hand wheel 52 in the well known manner. However, if this is not done, when a locomotive is connected to a car the charging of the train or handbrake pipe 14 will restore the unit to the released and reset condition of FIG. 2. The inflation of the air bellows 34 causes downward movement of the rod 25 and collar 50 which initially causes the output rod 20 to rotate about the pivot point 40 moving the pivot point 21 towards its reset position. Once the collar 50 engages the reset lever 42, the reset chain 23B is drawn down pulling the brake chain 23A up which simultaneously raises the pivot point 21, thereby shortening the brake chain 23A. The travel from the manually released position to the automatically reset and released positioned is illustrated in the solid line of FIG. 4 and is the resulting solid line of FIG. 2.

Because the brake chain 23A is a chain and not a rigid connection, the pivot point 21 is fixed with respect to forces down or away from the manual actuator 17 and will move with respect to forces of the opposite direction. Also, the reset mechanism resets the manual actuator by tension and not compression as in my previous patent. This permits the use of a standard, commercially available handbrake unit the manual actuator 17.

Figure 5:
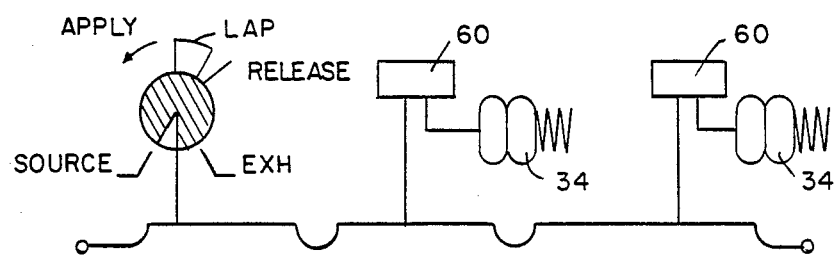
FIG. 5 is a schematic view of the fluid control system.
Figure 6:
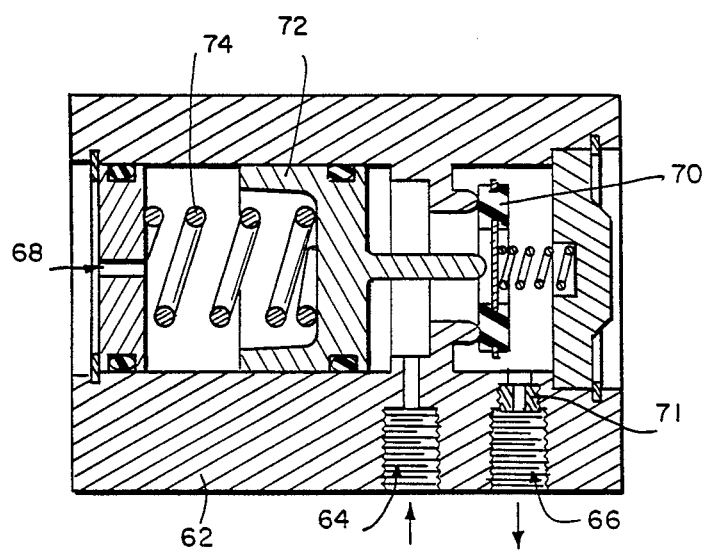
FIG. 6 is a cross-sectional view of an interlock valve of FIG. 5.

The use of the air bellows 34 provides the large forces needed without an extra large piston and cylinder. In order to prevent interference with the normal air brake system's operation by air flowing back into the brakepipe from air bellows 34 when brake pipe pressure is reduced within its normal operating service pressure range of 50–110 PSI, the air bellows 34 can be connected to the brake pipe 10 by a simple interlocking valve 60 as illustrated in FIG. 5. The interlocking valve 60 prevents feedback of pressure from the air spring into the brake pipe which would extend the time needed to exhaust the brake pipe 10 and could also cause release of applied train brakes.

The interlocking valve 60 includes a housing 62 with a brake pipe port 64, handbrake actuator port 66 and vent port 68. A charging check valve 70 interconnects the brake pipe port 64 and the handbrake actuator port 66. A charging restriction or orifice 21 is provided in the hand brake actuator port 66. An interlock piston 72 has a 20 psi spring 74 biasing the piston 72 on one side to open the charging check 70. The other side of the piston 72 is responsive to pressure at the brake pipe port 64. When the brake pipe is charged, the interlock piston 72 is moved to the left against a 20 psi biasing spring 74. In its left most position, it allows the charging check valve 70 to seat. This check valve 70 permits flow of air from brake pipe to the actuator and will assure a release of the handbrake a the brake pipe 10 is charged. However, when brake pipe pressure is reduced, the charging check valve 70 seats preventing any flow of brake actuator 16's air back to the brake pipe 10. This keeps the parking brake released and fully charged and prevents interference with train brake operation. When, however, the brake pipe pressure drops below 20 psi, the interlock piston 72 will move to the right (under the influence of the 20 lb. spring) and its pilot stem will force the charging check valve 70 off its seat permitting air to flow back through the charging orifice 71 and into the brake pipe. Since this low pressure will only obtain when brake pipe is vented (as when a locomotive is taken off the train), there will be no hindrance to parking brake operation. The size of the charging orifice 71 is chosen to be small enough to assure that, for example, in an emergency brake application, the automatic release actuator will remain charged above 45 psi long enough to assure that the train is brought to a halt by the normal air brake before the parking brake is applied "on top of" the air brake application. If this time delay were not introduced, the combination of air brakes plus the parking brake could result in sliding wheels. Thus it can be seen that the complicated interlocking valving of my previous patent is eliminated.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A parking brake system for a railway vehicle having at least a fluid pipe and a brake actuator for actuating a brake rigging comprising:

output lever means having first, second and third pivot points;

brake means for pivotally connecting a brake actuator to said output lever at said first pivot point;

manual actuator means, including a manually releasable ratchet mechanism and a chain having a first end pivotally connected to said output lever at said third pivot point, for releasing said third pivot point to pivot said output lever means to move said first pivot point to a brake release position; and automatic actuator means pivotally connected to said output lever means at said second pivot point and connect to said second end of said chain for pivoting said output lever to move said first pivot point to a brake release position and reseting, after a manual release, said manual actuator means by pulling said second end of said chain in response to a release fluid pipe pressure and for pivoting said output lever to move said first pivot point to a brake application position in response to an application fluid pipe pressure.

2. A parking brake system according to claim 1 wherein said manual actuator means maintains said third pivot point fixed with respect to forces at said third pivot point in a first direction and moveable with respect to forces at said third pivot point in a second direction.

3. A parking brake system according to claim 1 wherein said automatic actuator means also moves said third pivot point from a manual release position to a manual reset position in response to said release fluid pipe pressure after manual release.

4. A parking brake system according to claim 1 wherein said first pivot point is between said second and third pivot points.

5. A parking brake system according to claim 4 wherein said first pivot point is equidistant to said second and third pivot points.

6. A parking brake system according to claim 1 wherein said automatic actuator means includes a piston spring biased to move said first pivot point to a brake application position and responsive to said release and application fluid pipe pressures.

7. A parking brake system according to claim 6 wherein said automatic actuator means includes an air spring responsive to said fluid pipe pressures to control said piston.

8. A parking brake system according to claim 6 wherein said automatic actuator means includes a reset lever connected to said second end of said chain and said piston moves said lever to pull on said second end of said chain.

9. A parking brake system according to claim 1 wherein said automatic actuator means is connected to said fluid pipe by an interlocking valve means for preventing fluid from flowing from said automatic actuator means to said fluid pipe for fluid pipe pressures above approximately 20 psi.

10. A parking brake system according to claim 9 wherein said interlocking valve means includes a charging orifice to slow the fluid flow between said fluid pipe and said automatic actuator means.

11. A parking brake system for a railway vehicle having at least a fluid pipe and a brake actuator for actuating a brake rigging comprising:
output means for connecting a brake actuator to said parking brake system;
automatic actuator means connected to said output means for moving said output means to a brake release or a brake application position in response to release or application fluid pipe pressure respectively;
manual actuator means connected to said output means for moving said output means to a brake release position in response to manual activation; and
interlocking valve means interconnecting said automatic actuator means and said fluid pipe for preventing fluid from flowing from said automatic actuator means to said fluid pipe for fluid pipe pressures above a predetermined value of pressure and permitting fluid to flow from said fluid pipe to said automatic actuator means.

12. A parking brake system according to claim 11, wherein said interlocking valve means includes a charging orifice to slow the fluid flow between said fluid pipe and said automatic actuator means.

13. A parking brake system according to claim 11, wherein said predetermined pressure is approximately 20 psi.

14. A parking brake system according to claim 11, wherein said interlocking means includes a charging check valve for permitting fluid to flow from said fluid pipe to said actuator means and a pressure sensor means for opening said check valve at fluid pipe pressures below said predetermined value of pressure for permitting fluid from flowing from said automatic actuator means to said fluid pipe.

* * * * *